(12) United States Patent
Conradt et al.

(10) Patent No.: US 8,614,425 B2
(45) Date of Patent: Dec. 24, 2013

(54) DEVICE FOR STERILIZING WATER AND USE OF SAME

(75) Inventors: Berthold Conradt, Wiesbaden (DE); Ron Kemmer, Wertheim (DE)

(73) Assignee: Brita GmbH, Taunusstein (DE)

( * ) Notice: Subject to any disclaimer, the term of this patent is extended or adjusted under 35 U.S.C. 154(b) by 249 days.

(21) Appl. No.: 12/737,387

(22) PCT Filed: Jul. 10, 2009

(86) PCT No.: PCT/EP2009/058820
§ 371 (c)(1),
(2), (4) Date: Mar. 31, 2011

(87) PCT Pub. No.: WO2010/004028
PCT Pub. Date: Jan. 14, 2010

(65) Prior Publication Data
US 2012/0011874 A1  Jan. 19, 2012

(30) Foreign Application Priority Data
Jul. 10, 2008  (DE) .......... 10 2008 040 335

(51) Int. Cl.
*A61L 2/10* (2006.01)
*C02F 1/32* (2006.01)

(52) U.S. Cl.
USPC ............ 250/455.11; 250/454.11; 250/453.11; 250/504 R; 422/22; 422/23; 422/24

(58) Field of Classification Search
USPC ............ 250/428, 432 R, 433, 435, 436, 437, 250/453.11, 454.11, 455.11; 422/22, 23, 24
See application file for complete search history.

(56) References Cited

U.S. PATENT DOCUMENTS

| | | |
|---|---|---|
| 2,056,635 A | 10/1936 | Wiegand |
| 2,625,670 A | 1/1953 | Embshoff |
| 4,077,876 A | 3/1978 | Southall |
| 4,204,965 A | 5/1980 | Vincent |
| 4,769,131 A | 9/1988 | Noll et al. |
| 4,931,685 A | 6/1990 | Dobashi et al. |
| 4,965,484 A | 10/1990 | Fein |
| 5,059,860 A | 10/1991 | Sato et al. |
| 5,230,792 A | 7/1993 | Sauska et al. |
| 5,645,720 A | 7/1997 | Godines |
| 5,653,871 A | 8/1997 | Thomsen |
| 5,843,309 A | 12/1998 | Mancil |
| 5,909,085 A | 6/1999 | Nelson |
| 6,083,387 A | 7/2000 | LeBlanc et al. |

(Continued)

FOREIGN PATENT DOCUMENTS

| | | |
|---|---|---|
| CA | 2 051 447 | 10/1990 |
| DE | 38 37 906 A1 | 6/1989 |

(Continued)

*Primary Examiner* — Nicole Ippolito
(74) *Attorney, Agent, or Firm* — Hudak, Shunk & Farine Co. LPA (57) ABSTRACT

A device for sterilizing water, comprising a UV lamp, at least one vessel through which water flows, an inlet and an outlet, a reaction chamber being arranged in said vessel. The outlet of the container forms a free down spout. The UV lamp and the vessel are arranged in a cartridge, the cartridge comprising at least fixing means for detachable fixing to a connection device, and connection means for supplying the current and water from a connection device.

29 Claims, 6 Drawing Sheets

(56) References Cited

U.S. PATENT DOCUMENTS

| | | | |
|---|---|---|---|
| 6,144,175 | A | 11/2000 | Parra |
| 6,265,835 | B1 | 7/2001 | Parra |
| 6,468,419 | B1 | 10/2002 | Kunkel |
| 6,468,420 | B1 | 10/2002 | Kunkel |
| 6,593,704 | B2 | 7/2003 | Riepe et al. |
| 6,924,495 | B1 | 8/2005 | Brickley |
| 7,049,738 | B2 | 5/2006 | Fischer et al. |
| 7,061,173 | B2 | 6/2006 | Fischer et al. |
| 7,122,115 | B2 | 10/2006 | Holt et al. |
| 2002/0162969 | A1 | 11/2002 | Reed |
| 2003/0230981 | A1 | 12/2003 | Hiramoto |
| 2004/0027075 | A1 | 2/2004 | Hataoka et al. |
| 2004/0061069 | A1 | 4/2004 | Schalbe et al. |
| 2004/0182761 | A1 | 9/2004 | Kuennen et al. |
| 2004/0232846 | A1 | 11/2004 | Fischer et al. |
| 2005/0156119 | A1 | 7/2005 | Greene |
| 2007/0114465 | A1 | 5/2007 | Sajo et al. |
| 2007/0209984 | A1* | 9/2007 | Lev et al. ............... 210/143 |
| 2008/0156738 | A1 | 7/2008 | Albrecht et al. |
| 2008/0314808 | A1* | 12/2008 | Vandenbelt et al. ......... 210/85 |
| 2009/0145855 | A1* | 6/2009 | Day et al. ............... 210/748 |
| 2009/0205664 | A1* | 8/2009 | Lyon ............... 128/205.12 |
| 2011/0139698 | A1 | 6/2011 | Freystedt et al. |

FOREIGN PATENT DOCUMENTS

| | | |
|---|---|---|
| DE | 38 40 276 A1 | 5/1990 |
| DE | 39 24 350 A1 | 1/1991 |
| DE | 42 28 860 A1 | 3/1994 |
| DE | 199 63 640 A1 | 7/2001 |
| DE | 10 2009 000 092 A1 | 1/2010 |
| DE | 10 2008 040 336 A1 | 5/2010 |
| DE | 10 2006 044 294 A1 | 6/2010 |
| EP | 0 064 071 B1 | 5/1985 |
| EP | 0 312 002 A2 | 4/1989 |
| EP | 37 39 966 A1 | 6/1989 |
| EP | 0 611 153 A2 | 8/1994 |
| EP | 0 872 876 A | 10/1998 |
| EP | 1 440 941 A1 | 7/2004 |
| GB | 1 451 810 | 10/1976 |
| GB | 2 384 238 A | 7/2003 |
| JP | 01 260754 | 10/1989 |
| JP | 03 052686 | 3/1991 |
| JP | 07 272686 | 10/1995 |
| JP | 10 174708 | 6/1998 |
| WO | WO 96/09250 A1 | 3/1996 |
| WO | 98 52874 A2 | 11/1998 |
| WO | 00 78678 A2 | 12/2000 |
| WO | 03 045835 A1 | 6/2003 |
| WO | 03 287356 | 10/2003 |
| WO | 2004 048276 A1 | 6/2004 |
| WO | WO 2004/071965 A1 | 8/2004 |
| WO | WO 2005/100251 A1 | 10/2005 |
| WO | WO 2005/124236 A2 | 12/2005 |
| WO | WO 2006/043283 A1 | 4/2006 |
| WO | 2007 012079 A2 | 1/2007 |
| WO | 2007 025376 A2 | 3/2007 |
| WO | 2009 156509 A1 | 12/2009 |
| WO | 2010 004027 A1 | 1/2010 |
| WO | 2010 004028 A1 | 1/2010 |
| WO | 2010 010076 A1 | 1/2010 |
| WO | 2010 063722 A1 | 6/2010 |
| WO | 2010 063723 A1 | 6/2010 |

\* cited by examiner

DEVICE FOR STERILIZING WATER AND USE OF SAME

FIELD OF THE INVENTION

The invention relates to a device for sterilizing water with a UV lamp and at least one vessel through which water flows, having an inlet and an outlet, in which a reaction chamber is arranged, wherein the outlet of the vessel forms a free down spout. The invention also relates to the use of such a device.

Such a free down spout forms a water removal or tapping site, where the treated water can be removed by the user.

BACKGROUND OF THE INVENTION

The known sterilizing devices for so-called point-of-use application, i.e., application at the site of use, are chamber reactors, which generally consist of stainless steel or aluminum. The reactors are often cylindrical in shape and have two connections for the water inlet and for the water outlet. At the outlet a line is connected, leading to the tapping site. In the middle of the reactors there is a linear low-pressure mercury lamp. This UV lamp must be replaced at regular intervals in order to make sure that the required radiation power is always available for an effective sterilization.

From U.S. Pat. No. 4,769,131 there is known a sterilizing apparatus in which a UV lamp is arranged centrally in a housing, being surrounded by a tube coil, ending in corresponding connection fittings in the wall of the housing. The turns of the tube form the reaction chamber and are irradiated by the UV lamp. To replace the lamp, a plate at the end of the housing has to be removed. The lamp is then drawn out from inside the tube coil.

The outlet can be connected directly to a water faucet or other suitable means of removal. These downstream components can provide additional sterilization. In addition, a traditional filter cartridge can be installed upstream from this sterilizing apparatus.

The reaction chamber can also be formed by grooves in the housing of the sterilizing device. In this case, the UV lamp is surrounded by a two-piece housing envelope.

From U.S. 2004/0182761 A1 there is known a sterilizing unit that provides a combination of filter and UV lamp. In a water conducting housing there is arranged, among other things, an annular carbon block, in which the UV lamp is placed. To replace the UV lamp, one must first open the housing and then remove the carbon block from the water located in the housing. The water located in the carbon block drains out when it is removed from the latter and contaminates the surroundings of the unit. Several manual operations are required before the UV lamp being replaced can be reached. Furthermore, the water conducting parts of the unit are exposed and grabbed by the user and therefore contaminated when replacing the carbon basin and/or UV lamp.

Another drawback is the design-related large space required by the unit, as well as the space required for inserting and removing the UV lamp. A final installation in familiar water-dispensing units is not advisable, because the space required at the tapping site would be very great. It is impractical, unaesthetic, and economically inadvisable. Examples of this would be installation in a water dispenser integrated in the door of a refrigerator or an installation in a water cooler with the dimensions of a table-top appliance.

Furthermore, the internal volume of the chamber is large in the appliances of this and the preceding document. This has the disadvantage that such sterilizing units are difficult to operate downstream from a unit that produces chilled drinking water. For the water in the reaction chamber of the sterilizing unit is generally located outside the refrigerating space and becomes warm. Furthermore, none of the known appliances have the ability to chill the water in the reaction chamber and/or the lamp by a cooling element, such as a heat dissipater.

From EP 1 440 941 B1 there is known a water treatment apparatus for beverage dispensers for serving drinking water. The appliance comprises a segment of a water pipe as the reaction chamber, with a UV lamp arranged upstream from the outlet of the water pipe, which forms a tapping site for the removal of the sterilized water, and parallel to the water pipe. The tapping site itself is located outside of the irradiation range of the UV lamp and provided with a protecting element to protect against being contaminated by the user.

The UV lamp can only be replaced with relatively great effort when needed. The reaction chamber is obviously permanently installed and therefore needs to be cleaned from time to time. However, no explanation of these issues is found in EP 1 440 941 B1. The sterilizing power of this appliance is poor in relation to its size, because the reaction chamber is only partly filled with water due to the air inlet situated on top.

SUMMARY OF THE INVENTION

Therefore, starting from EP 1 440 941 B1, the problem of the invention is to provide a sterilizing device in which the replacement of the UV lamp is possible in easy manner and negative effects from long-term buildup of coatings in the reaction chamber are avoided.

This problem is solved with a sterilizing device comprising a UV lamp and at least one vessel through which water flows, having an inlet and an outlet, with a reaction chamber, wherein the outlet of the reaction chamber forms a free down spout and thus a water removal site. The UV lamp and the vessel are arranged together in a cartridge, while the cartridge has at least fastening means for the detachable fastening to a connection device and connection means for the supply of water and current from a connection device.

The fastening means and/or the connection means are preferably plug-in and/or rotary type, in particular, plug-in and/or twist-in type.

The cartridge is preferably interchangeable.

It is therefore preferred to provide all connection means on one side of the cartridge. In this way, only one installation step is required, e.g., mounting or inserting the cartridge on a connection device. The fastening means are preferably arranged on the same side of the cartridge.

Snap-in and/or bayonet type means are preferably provided as the fastening means, enabling a fast replacement of the cartridge.

By the integration of both the vessel with the reaction chamber and the UV lamp in a common cartridge, a single compact piece is created, that can be manipulated by itself and replaced by the user in easy manner. A damaging of the UV lamp during the installing and removal is prevented, because this is located inside the cartridge and thus not accessible to the user. The cartridge can be operated self-standing, i.e., it can be operated without limiting its functionality, and no additional housing or the like is required in which the cartridge needs to be installed in order to operate it.

The cartridge is an interchangeable part that can be disposed of as a whole.

The cartridge is a closed container that has at least one inlet for the liquid being treated and at least one outlet for the treated liquid. This achieves a further benefit, which is that the user has no contact with the water-conducting parts of the interior, especially those situated after (downstream from) the reactor, so that a contamination is effectively prevented.

Preferably, the UV lamp and the vessel are disposed captively in the cartridge, so that when removing or installing the cartridge the respective components cannot drop out from the cartridge unintentionally. The captive arrangement does not rule out a detachable arrangement.

According to another embodiment, the UV lamp and the vessel are arranged undetachably in the cartridge.

The undetachable fastening in the cartridge means that the user cannot remove the lamp from the cartridge, which does not rule out a possible separation of the components in the context of recycling.

By the replacement of the cartridge, the vessel with the reaction chamber and the outlet is replaced together with the lamp, so that the reaction chamber is also replaced at regular intervals of time, preferably oriented to the replacement cycles of the UV lamp. A separate cleaning of the reaction chamber to remove deposits is not required. The danger of malfunction due to formation of coatings is avoided.

The dimensioning of the cartridge is distinctly smaller than that of the known sterilizing units, so that even an installation, preferably a self-standing installation, in refrigerators of common dimensions, for example, is possible. The inner volume of the reaction chamber is also much smaller, so that the quantity of warm water at the start of the tapping process is small, which is of special benefit in connection with refrigerators.

Preferably, the cartridge has an opening located in the wall of the cartridge, in which the outlet of the vessel is located. One special embodiment calls for the outlet of the vessel to be located in the radiation range of the UV lamp.

Since the outlet of the vessel also forms the tapping site at the same time, the user can fill the treated water directly into his drinking glass from the opening. Since the outlet of the vessel and thus the tapping site itself is located in the radiation range of the UV-lamp, this eliminates any subsequent or back contamination at once. Any contamination by the user, such as by grabbing the down spout region, cannot affect the quality of the water.

Preferably, the vessel has no nonradiated dead spaces from the start of the reaction chamber to the outlet of the vessel. The reaction chamber begins behind the inlet of the vessel in the direction of flow. The vessel has no connection elements that could form dead spaces for the water.

In order to totally rule out a contamination by the user, it is advantageous when the outlet of the vessel is set back relative to the opening of the cartridge. This feature offers an additional advantage, because the cartridge wall in the region of the opening prevents the UV radiation from exiting from the opening.

A further improvement is preferably achieved in that the down spout of the vessel, especially the inner surface of the down spout coming into contact with the water, has a hydrophobic surface. This feature has the benefit that it is harder for deposits and also germs to cling on. This further prevents the formation of coating, which would reduce the radiation intensity, and growth of biofilm. If the down spout runs partly empty after water is removed, neither is any wetting water film left behind that can encourage bacterial contamination.

Preferably the vessel has in the region of the reaction chamber at least one winding through which water can flow. A plurality of windings can be arranged, for example, in meandering fashion adjacent to the UV lamp. The individual windings can be oriented perpendicular or parallel to the longitudinal direction of the UV lamp.

Preferably, the region of the reaction chamber of the vessel is formed from a coil, especially a helical coil, which can be configured as a tube or hose coil. The UV lamp is situated in the central region of the coil. The coil has the benefit that all of the water being treated runs through the longest possible defined pathway in the radiation zone of the UV lamp, while the coil shape ensures uniform flow conditions and a good circulation of the water. This contributes to optimal performance with minimal volume of the reaction chamber. The wall thickness of the coil is preferably in the range of 0.1 to 0.5 mm. The advantage of this feature is that the UV radiation is minimally attenuated. The flow cross section and the length of the water conduit in the reaction chamber are preferably chosen such that the reactor internal volume is less than 120 ml. A reactor internal volume less than 40 ml is especially advantageous.

When the sterilizing device is operated downstream from an appliance that produces cooled drinking water, the quantity of water in the reaction chamber will be kept low, so that the consumer finds sufficient cooled water in the first glass tapped.

Preferably, the vessel at least in the region of the reaction chamber and/or the down spout consists of a hydrophobic material, especially a hydrophobic polymer.

Preferably, the vessel at least in the region of the reaction chamber and/or the down spout consists of a fluoropolymer, such as PFA (perfluoralkoxyvinyl ether polymer resin), MFA (perfluoralkoxymethylvinyl ether polymer resin), FEP (fluorinated ethylene propylene copolymer), PTFE (polytetrafluorethylene), THV (terpolymer of tetrafluorethylene, hexafluorpropylene and vinylidene fluoride).

According to one special embodiment, the vessel can consist of a UV-C-resistant injection molded part, which can be installed in the cartridge during the assembly of the sterilizing device.

Preferably, the outlet of the vessel has a down spout piece. The end region of the vessel, especially in the case of a hose coil, must generally be curved in the direction of the outlet in order to assure a troublefree position of the outlet of the vessel inside the cartridge. The manufacturing process can be simplified, in connection with a high degree of safety, in that a prefabricated down spout piece is mounted on the outlet. The down spout piece as well as its connection region to the vessel are likewise situated in the radiation zone of the UV lamp. The down spout piece preferably consists of the same material as the vessel and is likewise transparent to UV-C radiation. This effectively prevents a bacterial contamination at the connection site between down spout piece and vessel.

Preferably a reflector means reflecting in the UV range is provided between the wall of the cartridge and the vessel and/or in the down spout section of the cartridge. Thanks to the back reflection in the direction of the UV lamp, the reaction chamber is further subjected to the UV radiation. The efficiency of the water sterilizing device is improved and the structural length can be shortened for the same emission power.

Preferably the reflector means is a reflective coating on the inner surface of the cartridge wall or on the outer wall of the vessel. Metals in particular are considered as the coating materials, such as aluminum, chromium, nickel, as well as fluoropolymers and materials which contain metal oxides and metal salts.

According to another embodiment, the reflector means can be a reflecting part, such as a sleeve, which is inserted into the cartridge and/or over the vessel, or a film, especially a metal foil, a plastic film reflecting in the UV range, or a metallized plastic film. The sleeve can consist of metal, for example, especially aluminum.

One special embodiment calls for the sleeve to protrude from the cartridge. For example, the sleeve can be grasped in a connection device into which the cartridge is inserted and be used as a thermal bridge. When the reflector means is connected, for example, to a cooled region or a region with lower temperature or a cooling element, as is possible in a refrigerator, for example, a cooling inside the cartridge and thus also a cooling of the water and/or the UV lamp is brought about in simple manner.

This thermal bridge can also be realized by a heat-conducting element that is led out from the cartridge. This can be, for example, a heat pipe. The heat-conducting element can protrude from the cartridge in the region of the connection means. The heat-conducting element can be arranged, for example, on the vessel wall or on the reflecting part, especially on the sleeve.

The fastening means and the connection means can be provided at one end of the cartridge or, according to another embodiment, at one side wall of the cartridge.

The outlet can be provided at one bottom wall of the cartridge or at one side wall of the cartridge.

The arrangement of the connection means, the fastening means, and possibly the heat-conducting element and the outlet depends on the installation position of the cartridge. The cartridge can be inserted horizontally or vertically in a corresponding connection device.

The UV-lamp preferably has a lamp base, which has the connection means for the supply of current. The connection means can be metal pins, for example. No other connection means are then required for the supply of current, since the lamp base which is present any way can be used for this. This can further simplify the cartridge.

The control electronics can be located outside the cartridge. When the sterilizing device is installed in a refrigerator, the control electronics can be integrated in the control electronics of the refrigerator.

Further possibilities of accommodating the control electronics are the connection device or the lamp base of the UV-lamp. When accommodated in the lamp base, the control electronics can be individually attuned to the type of lamp and thus different UV lamps can be installed or inserted in the existing connection device in certain situations.

A preferred use of the water sterilizing device is in cooling appliances, especially refrigerators. This also includes the use in beverage dispensers, coolers and chillers.

BRIEF DESCRIPTION OF THE DRAWINGS

Sample embodiments of the invention will now be explained more closely by means of the drawings. There are shown.

DETAILED DESCRIPTION OF THE INVENTION

Figure 1:
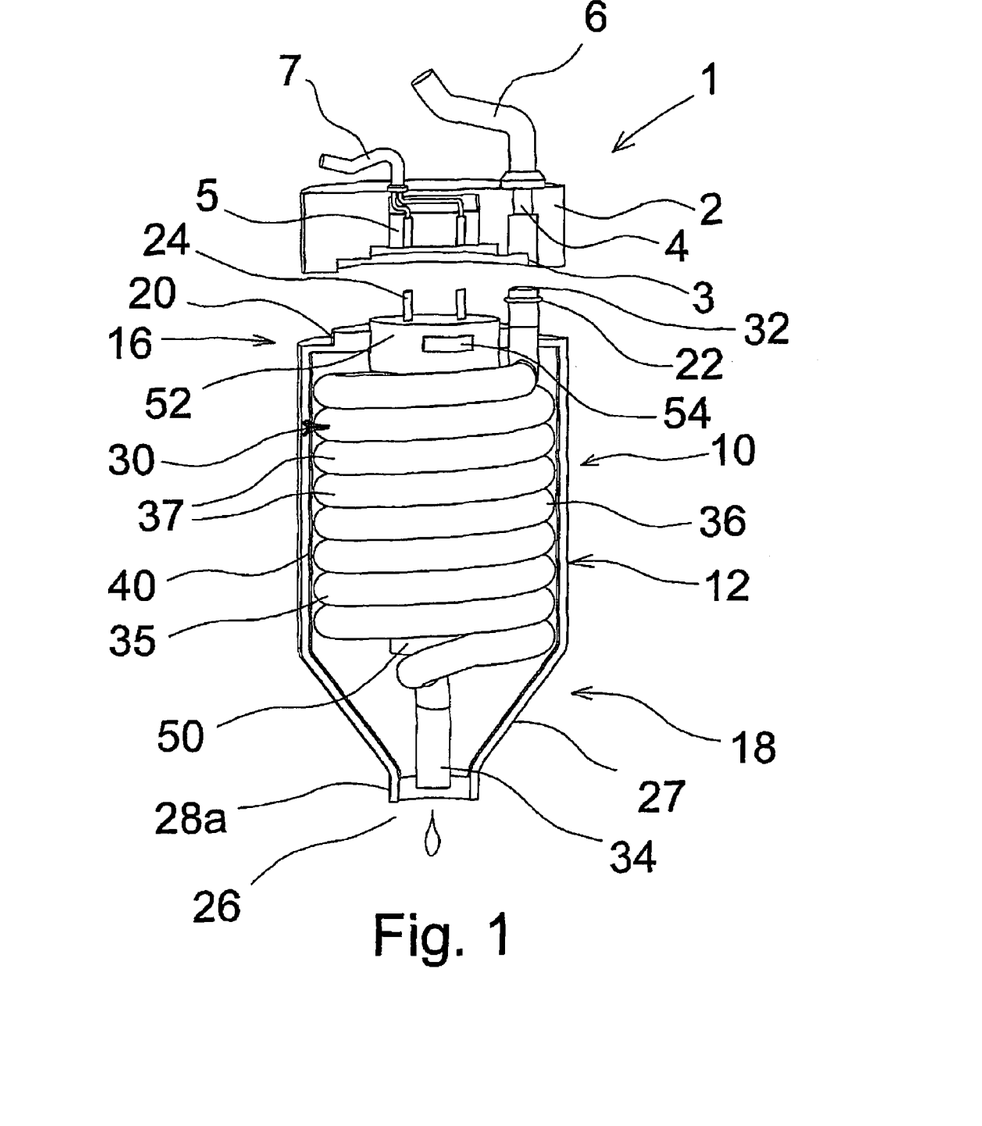
FIG. 1, a perspective representation of a cartridge with accompanying connection device, FIG. 2, another embodiment of a cartridge, FIG. 3, another embodiment of a cartridge, FIGS. 4, 5, perspective enlarged representations of the vessel with outlet, and FIG. 6, a perspective representation of a connection device.

In FIG. 1 is shown a device for sterilizing water, having a cartridge 10, in which the vessel 30 in the form of a helical coil 36 is arranged. The segment fashioned as the helical coil 36 contains the reaction chamber 35, through which flows the water being treated.

The cartridge 10 has a cylindrical side wall 12, at whose upper end 16 is provided a flange with fastening means 20, which can be designed, e.g., as bayonet or snap-in elements. Details of the fastening means 20 are not shown in FIG. 1.

At the upper end 16 of the cartridge is provided an inlet opening, through which the inlet 32 of the vessel 30 is led out. At the lower end 18 of the cartridge 10, the bottom wall 27 is fashioned in the shape of a cone and forms a down spout section 28a with an opening 26. In this opening 26, the outlet 34 of the vessel 30 is set back, thereby preventing the user from making direct contact with the outlet 34. The outlet 34 together with the opening 26 of the cartridge 10 forms a tapping site or water removal site. This is indicated by the drops shown beneath the opening 26.

In the central region of the coil 36 is situated the UV-lamp 50, which puts out its UV-power radially and thus irradiates the water flowing in the coil 36. The turns 37 of the coil 36 surround the lamp 50 almost completely, so that the majority of the UV-power of the UV-lamp 50 makes it into the reaction chamber 35. The lamp 50 and the outlet 34 are disposed such that the outlet 34 is located in the radiation zone of the UV-lamp. In the lower region, the UV-lamp 50 radiates not only radially but also in all directions, so that the outlet 34 is included. The tapering down spout section 28a has the advantage that the UV radiation hitting the outlet is largely held back in the cartridge 10 and only a small portion can escape through the opening 26. The emerging UV radiation is essentially reduced to the portion of the radiation located in the emerging water stream.

The side wall 12 and the drain spout section 28a are provided with a coating 40 that is reflecting in the UV-C range, especially in the relevant radiation range of the lamp for the sterilization. When mercury low-pressure lamps are used, this involves the radiation at 254 nm.

At the upper end, the UV-lamp 50 has the lamp base 52 with the connection means 24 for current. The cartridge 10 does not have separate connection means for this, since the already present connection means of the lamp base 52 are used. Furthermore, the control electronics 54 of the lamp 50 are arranged in the lamp base 52. Details regarding the fastening of coil 36 and UV-lamp 50 inside the cartridge 10 have been omitted for clarity. Both parts are preferably held by means of precise-fit injection-molded parts.

Above the cartridge 10 is a suitable connection device 1 with housing 2, into which the cartridge 10 is inserted. For this purpose, the connection device 1 likewise has corresponding fastening means 3, which can comprise, for example, the second part of a bayonet seal or a snap-in device. Moreover, the connection device 1 has a water connection port 4 and a current connection 5, which interact with corresponding connection means 22 and 24 of the cartridge 10 when the cartridge 10 is inserted and/or twisted into the connection device 1. The connection device 1 is supplied via the water hose 6 and the power cable 7. The connection device 1 can be mounted, for example, in a beverage dispenser with cooling appliance, such as a refrigerator or cooler.

Figure 2:
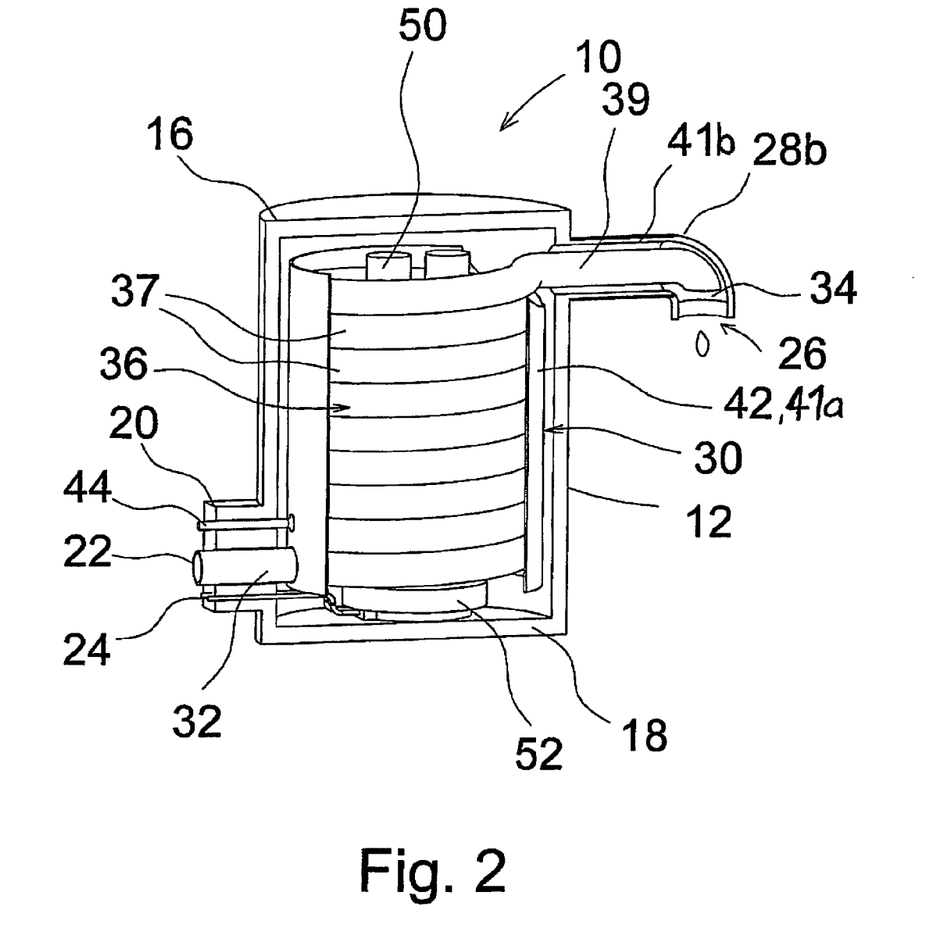

In FIG. 2 another embodiment of the cartridge 10 is depicted. In this embodiment as well, a vertical installation is provided. The cartridge 10 is closed off at the top and bottom end 16, 18 by a wall and also has a cylindrical side wall 12. The arrangement of the vessel 30 with the reaction chamber 35 and the UV-lamp 50 with lamp base 52 corresponds to the arrangement of FIG. 1. Inside the cartridge 50 between vessel 30 and side wall 12 is arranged a first part 41a reflecting in the UV-range, in the shape of a sleeve 42, surrounding the coil 36; in the lower region is arranged a heat-conducting element 44 in the form of a pin led out through the cartridge wall.

The UV radiation given off by the UV-lamp 50 penetrates the coil 36 with the turns 37 and is reflected back inside by the reflecting sleeve 42, so that the reflected UV radiation again passes through the reaction chamber 30.

In contrast with the sterilizing device of FIG. 1, the inlet 32 is provided in the lower region and the direction of flow of the water being sterilized is from bottom to top. For this reason, the fastening means 20 as well as the connection means 22 and 24 are disposed laterally on the cartridge wand 12 at the lower end. Also here is provided the heat-conducting element 44. The fastening means 20, not shown in detail, permit a horizontal insertion of the filter cartridge 10. The lamp 50 is likewise inserted from the bottom into the interior of the coil 36.

At the top end 16 of the cartridge 10, at the side of the cartridge wand 12, there is molded on a down spout section 28*b*, in which a horizontally arranged connection segment 39 of the vessel 30 is arranged, at whose end the outlet 34 is situated. The down spout section 28*b* has an opening 26, relative to which the outlet 34 is set back.

The down spout section 28*b* is provided with a second reflecting part 41 *b* in the form of a coated film, in order to guide the UV radiation from the lamp to the outlet 34.

Figure 3:
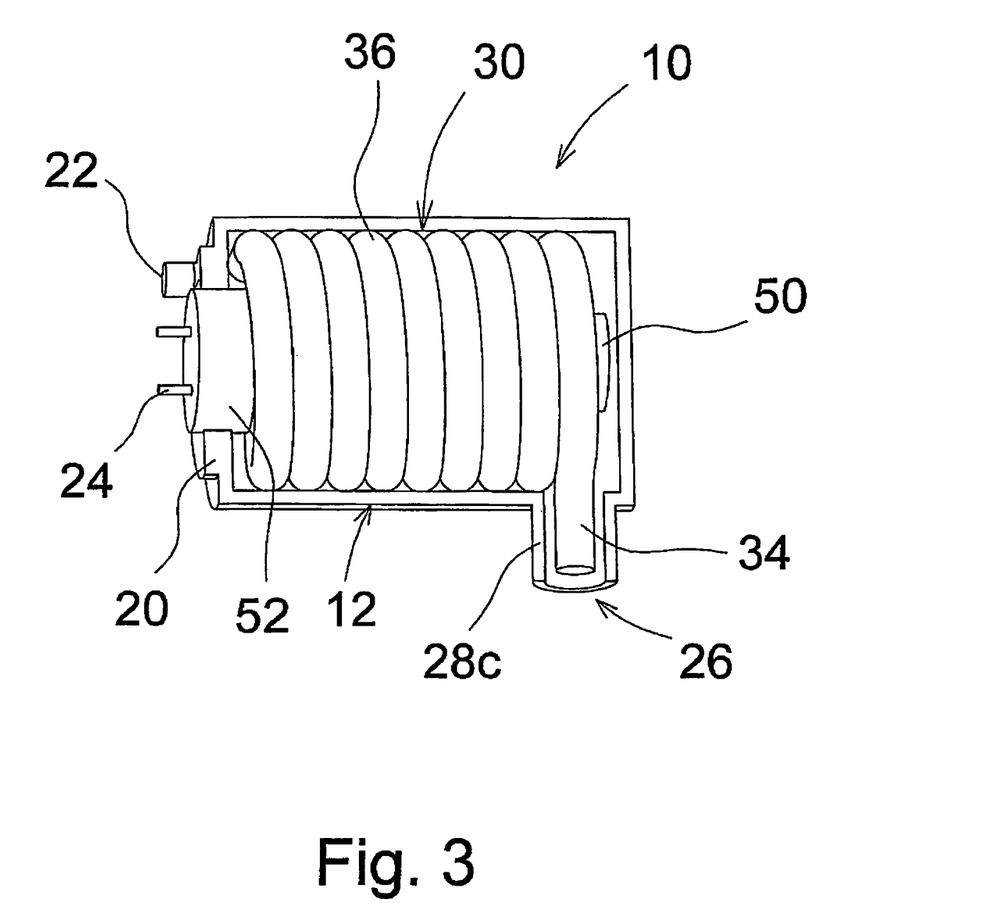

In FIG. 3 is shown another embodiment of a cartridge 10 that is horizontally installed. In contrast with FIG. 1, a down spout section 28*c* is molded at the side on the cartridge wall 12. Inside this down spout section is found the outlet 34 of the reaction chamber 30.

Figure 4:
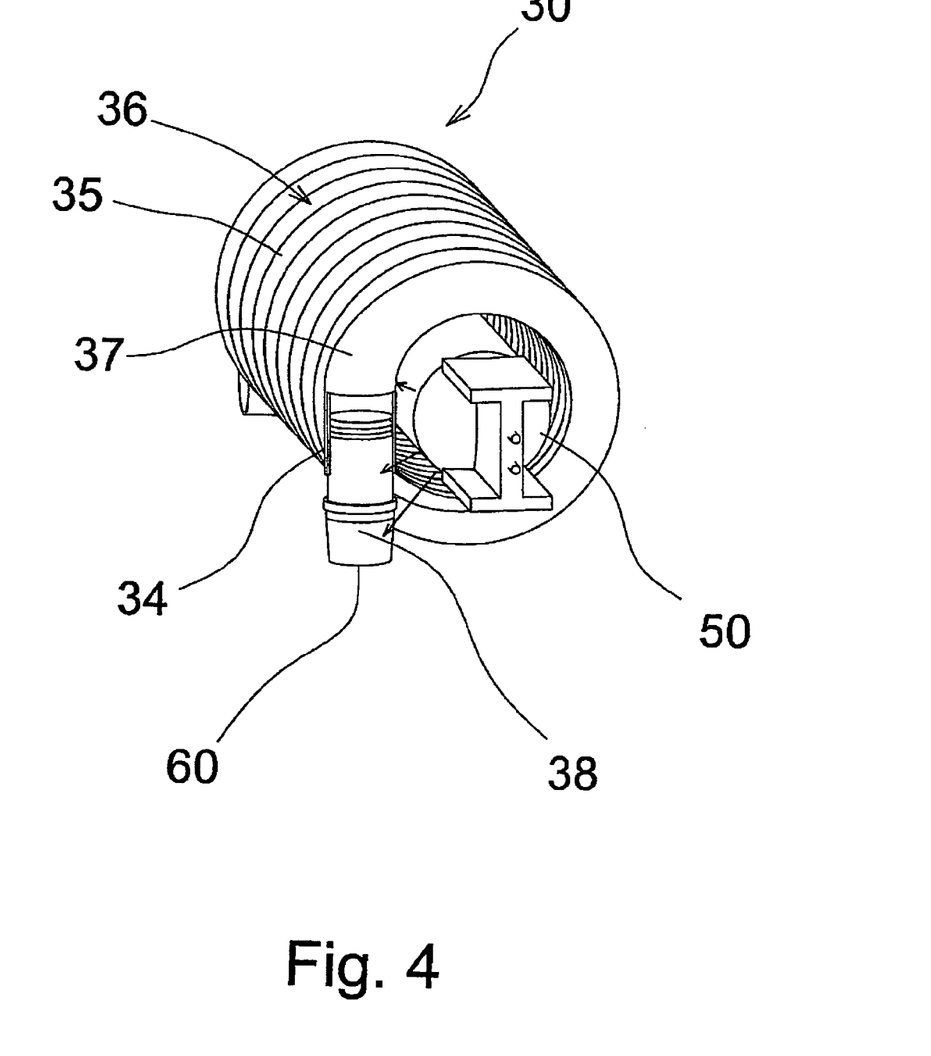

In FIG. 4 the vessel 30 with the reaction chamber 35 is shown enlarged. The end of the last turn 37 is somewhat tangentially curved, so that a downward directed outlet 34 is formed. In the down spout 34 is inserted a down spout section 38, which likewise consists of UV-C-transparent material, as does the vessel 30. The arrows indicate that the UV light emitted by the UV-lamp 50 located at the center of the coil 36 irradiates the outlet 34 and also the outlet piece 38.

The outlet piece 38 is conical in shape and can have a lip seal 60 at the lower end, which opens automatically when the water jet emerges. The conical shape in conjunction with the lip seal 60 has the advantage that UV radiation that is led inside the turns 37 to the outlet 34 is held back and thus cannot get to the outside.

Figure 5:
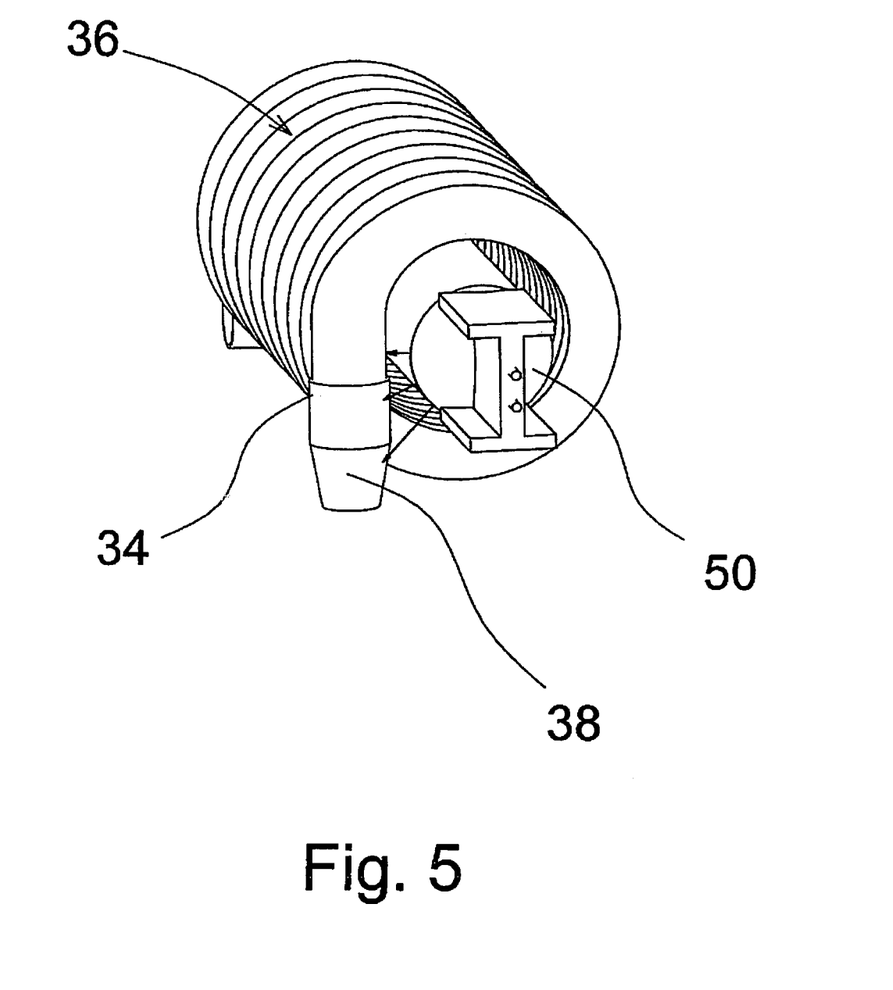

In FIG. 5 is shown another embodiment, differing only in the outlet piece 38 from the configuration of FIG. 4. The outlet piece 38 is shoved onto the outlet 34 of the vessel 30.

Figure 6:
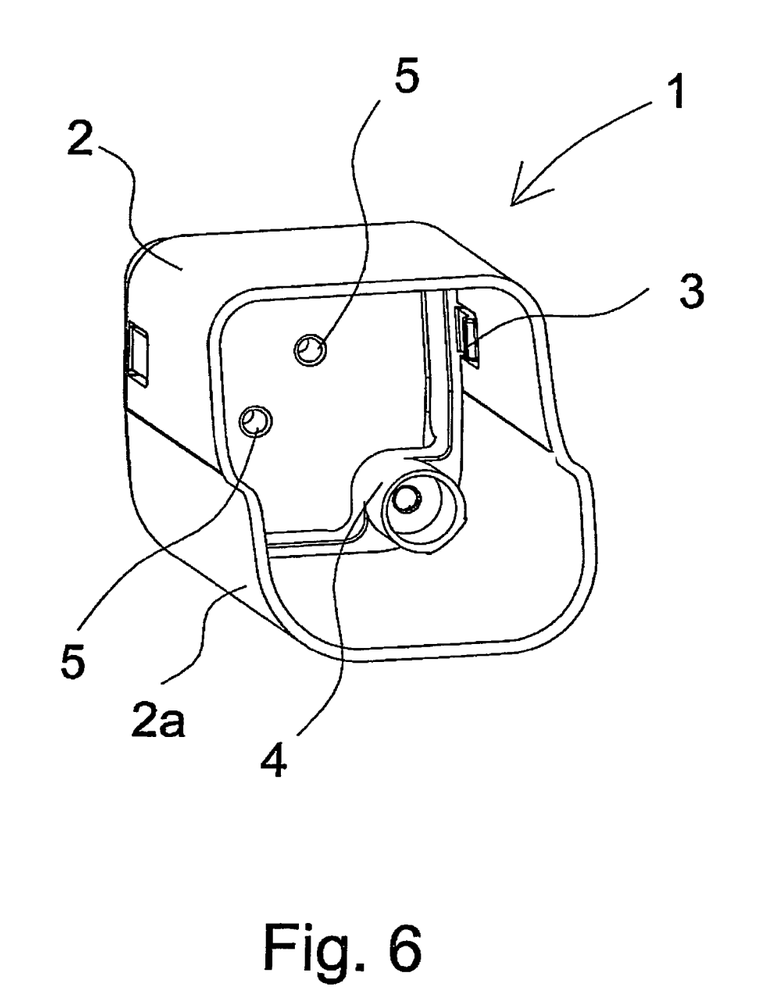

In FIG. 6 is shown another embodiment of a connection device 1 for the horizontal installation of a cartridge 10 in perspective view. The connection device 1 has a cylindrical housing 2, passing into a tub-shaped segment 2*a* in the front region. On the inner wall of the tub-shaped segment 2*a* is located a fastening means 3, which interacts with a corresponding fastening means on the cartridge and holds the cartridge in the tub-shaped segment 2*a*. On the rear wall of the housing 2 are provided the water connection port 4 and the current connection 5.

LIST OF REFERENCE NUMBERS

1 connection device
2 housing
2*a* tub-shaped segment
3 fastening means
4 water connection
5 current connection
6 water hose
7 power cable
10 cartridge
12 side wall
16 upper end
18 lower end
20 fastening means
22 connection means (water)
24 connection means (current)
26 opening
27 bottom wall
28*a, b, c* down spout section of the cartridge
30 vessel
32 inlet
34 outlet
35 reaction chamber
36 coil
37 turn
38 down spout piece
39 connection section
40 reflective coating
41 reflecting part
42 sleeve
44 heat-conducting element
50 UV-lamp
52 lamp base
54 control electronics
60 lip seal

What is claimed is:

1. A device for sterilizing water, comprising: a UV lamp and at least one vessel through which water flows, having an inlet and an outlet, in which a reaction chamber is arranged, wherein the outlet of the vessel forms a free spout wherein water emerging out from the spout can drop by gravity,
   wherein the UV lamp and the vessel are arranged together inside a cartridge, and
   the cartridge has at least fastening means for detachable fastening to a connection device and connection means for the supply of water and current from the connection device.

2. The device according to claim 1, wherein the UV lamp and the vessel are disposed captively in the cartridge.

3. The device according to claim 1, wherein the UV lamp and the vessel are arranged undetachably in the cartridge.

4. The device according to one of claims 1, wherein the cartridge has an opening located in one wall of the cartridge, in which the outlet of the vessel is located.

5. The device according to claim 1, wherein the outlet of the vessel is located in the radiation range of the UV lamp.

6. The device according to claim 1, wherein the vessel has no nonradiated dead spaces from the start of the reaction chamber to the outlet of the vessel.

7. The device according to claim 1, wherein the outlet of the vessel is set back relative to the opening of the cartridge.

8. The device according to claim 1, wherein the outlet of the vessel has a hydrophobic surface.

9. The device according to claim 1, wherein the vessel has in the region of the reaction chamber at least one winding through which water can flow.

10. The device according to claim 1, wherein the vessel at least in the region of the reaction chamber and/or the outlet consists of a hydrophobic material.

11. The device according to claim 1, wherein vessel at least in the region of the reaction chamber and/or the outlet consists of a fluoropolymer.

12. The device according to claim 1, wherein the vessel is an injection molded part.

13. The device according to claim 1, wherein the outlet of the vessel has a down spout piece.

14. The device according to claim 1, wherein a reflector means reflecting in the UV range is provided between a side wall of the cartridge and the vessel and/or in a down spout section of the cartridge.

15. The device according to claim 14, wherein the reflector means is a reflective coating on an inner surface of the cartridge wall or on an outer wall of the vessel.

16. The device according to claim 14, wherein the reflector means is a reflecting part.

17. The device according to claim 16, wherein the reflecting part is a sleeve.

18. The device according to claim 17, wherein the sleeve consists of metal.

19. The device according to claim 18, wherein the sleeve consists of aluminum.

20. The device according to claim 16, wherein the reflecting part is a film.

21. The device according to claim 16, wherein a heat-conducting element is provided, being led out from the cartridge.

22. The device according to claim 1, wherein the fastening means and the connection means are arranged at one end of the cartridge.

23. The device according to claim 1, wherein the fastening means and the connection means are arranged at one side wall of the cartridge.

24. The device according to claim 1, wherein the outlet is arranged at one bottom wall of the cartridge.

25. The device according to claim 1, wherein the outlet is provided at one side wall of the cartridge.

26. The device according to claim 1, wherein the UV-lamp has a lamp base, which has the connection means for the supply of current.

27. The device according to claim 26, wherein the lamp base contains a control electronics of the UV-lamp.

28. A cooling appliance comprising the water sterilizing device according to claim 1.

29. A refrigerator comprising the water sterilizing device according to claim 28.

* * * * *